United States Patent
Hittinger

(10) Patent No.: US 9,885,501 B2
(45) Date of Patent: Feb. 6, 2018

(54) THERMAL APPLIANCE AND METHOD FOR OPTIMIZING THE HEAT EXCHANGE THEREOF

(71) Applicant: COOLTECH APPLICATIONS, Holtzheim (FR)

(72) Inventor: Michaël Hittinger, Illkirch Graffenstaden (FR)

(73) Assignee: COOLTECH APPLICATIONS, Holtzheim (FR)

( * ) Notice: Subject to any disclaimer, the term of this patent is extended or adjusted under 35 U.S.C. 154(b) by 0 days.

(21) Appl. No.: 15/107,506

(22) PCT Filed: Dec. 22, 2014

(86) PCT No.: PCT/FR2014/053509
§ 371 (c)(1),
(2) Date: Jun. 23, 2016

(87) PCT Pub. No.: WO2015/097395
PCT Pub. Date: Jul. 2, 2015

(65) Prior Publication Data
US 2016/0320103 A1    Nov. 3, 2016

(30) Foreign Application Priority Data
Dec. 23, 2013   (FR) ..................... 13 63454

(51) Int. Cl.
  *F25B 21/00*   (2006.01)
  *F28F 27/02*   (2006.01)
  *F28D 15/00*   (2006.01)
(52) U.S. Cl.
  CPC .............. *F25B 21/00* (2013.01); *F28D 15/00* (2013.01); *F28F 27/02* (2013.01); *F25B 2321/002* (2013.01); *Y02B 30/66* (2013.01)

(58) Field of Classification Search
CPC ............ F25B 21/00; F25B 15/00; F28F 27/02
See application file for complete search history.

(56) References Cited

U.S. PATENT DOCUMENTS

| 8,881,537 B2 | 11/2014 | Muller et al. |
| 2011/0192834 A1 | 8/2011 | Muller et al. |

(Continued)

FOREIGN PATENT DOCUMENTS

| WF | 2013/076571 A1 | 5/2013 |
| WO | 2010/046559 A1 | 4/2010 |

OTHER PUBLICATIONS

International Search Report Corresponding to PCT/FR2014/053509 dated Apr. 21, 2015.

(Continued)

*Primary Examiner* — Cassey D Bauer
(74) *Attorney, Agent, or Firm* — Davis & Bujold PLLC; Michael J. Bujold

(57) ABSTRACT

A thermal appliance having an uneven number of closed primary circuits, each including at least two outlet points connected in series to at least one exchange zone. In each circuit, a primary fluid is circulating in an alternating cycle of period (T) having two displacement phases of a half-period (T/2) having identical flow rates and volumes but in opposite directions. The primary fluid circulation cycle is phase-shifted (by T/2N) between each of the primary circuits. The inlet of the exchange zone is connected unidirectionally to one of the outlet points of each of the primary circuits and the outlet of the exchange zone is connected unidirectionally to the other outlet points of the primary circuits so that the sum of the heat transfer fluid flow rates, entering the exchange zone, is always greater than zero. A method for optimizing the heat exchange of such a thermal appliance.

11 Claims, 7 Drawing Sheets

(56) References Cited

U.S. PATENT DOCUMENTS

2011/0314836 A1* 12/2011 Heitzler .................. F25B 21/00
                                                                                     62/3.1
2012/0285179 A1   11/2012  Morimoto et al.
2014/0290275 A1   10/2014  Muller

OTHER PUBLICATIONS

Written Opinion Corresponding to PCT/FR2014/053509 dated Apr. 21, 2015.

* cited by examiner

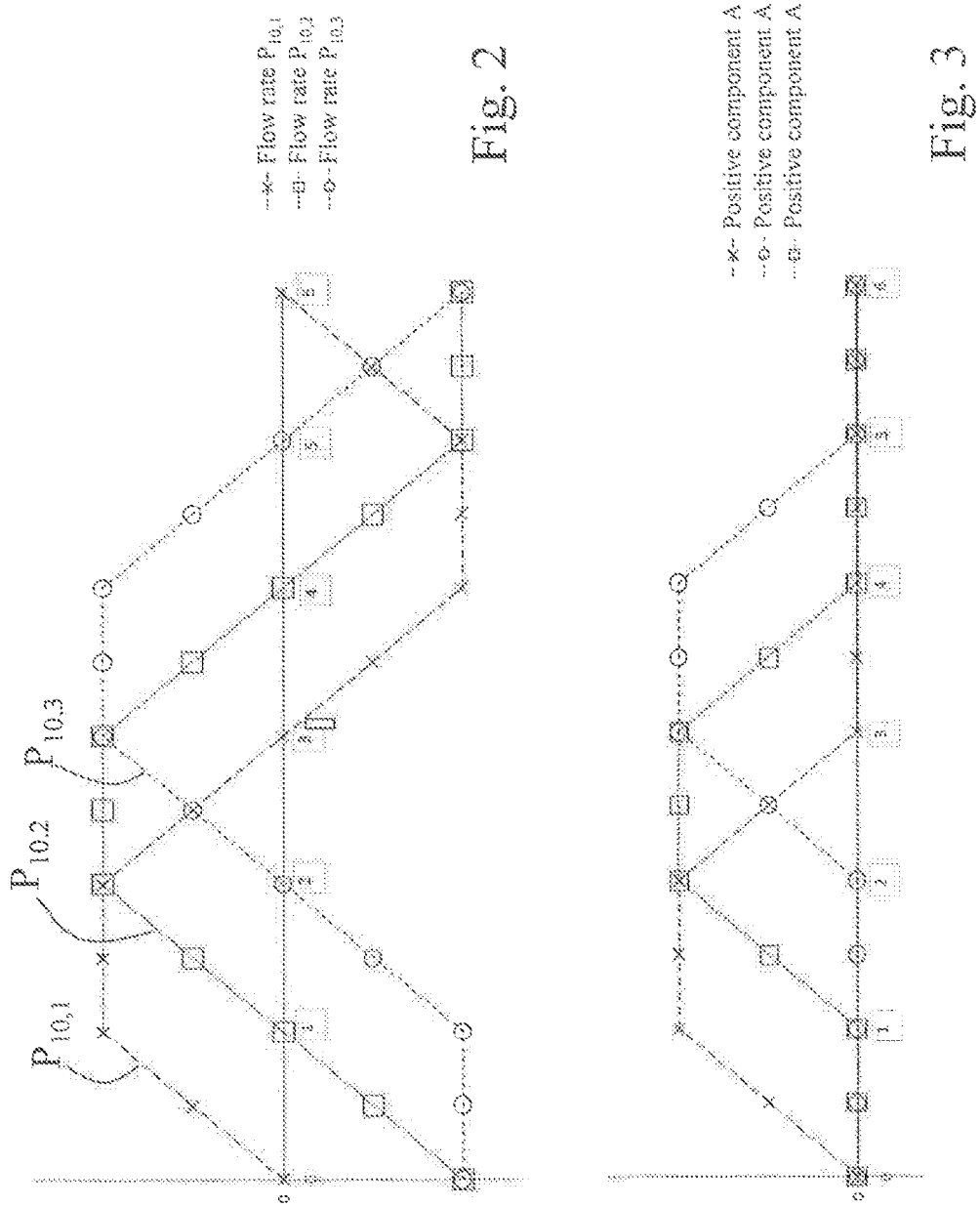

| Plages temporelles | Composante positive | | | | | Somme des débits | | | |
|---|---|---|---|---|---|---|---|---|---|
| | $A_{10,1}$ | $B_{10,1}$ | $A_{10,2}$ | $B_{10,2}$ | $A_{10,3}$ | $B_{10,3}$ | $A_{10,1} + A_{10,2} + A_{10,3}$ | $A_{10,1} + A_{10,2} + B_{10,3}$ | $A_{10,1} + B_{10,2} + A_{10,3}$ | $A_{10,1} + B_{10,2} + B_{10,3}$ |
| 0 à T/6 | 1 | 0 | 0 | 1 | 0 | 1 | 1 | 2 | 2 | 3 |
| T/6 à 2T/6 | 1 | 0 | 1 | 0 | 0 | 1 | 2 | 3 | 1 | 2 |
| 2T/6 à 3T/6 | 1 | 1 | 1 | 0 | 1 | 0 | 3 | 2 | 2 | 1 |
| 3T/6 à 4T/6 | 0 | 1 | 1 | 0 | 1 | 0 | 2 | 1 | 1 | 0 |
| 4T/6 à 5T/6 | 0 | 1 | 0 | 1 | 1 | 0 | 1 | 0 | 2 | 1 |
| 5T/6 à 6T/6 | 0 | 1 | 0 | 1 | 0 | 1 | 0 | 1 | 1 | 2 |

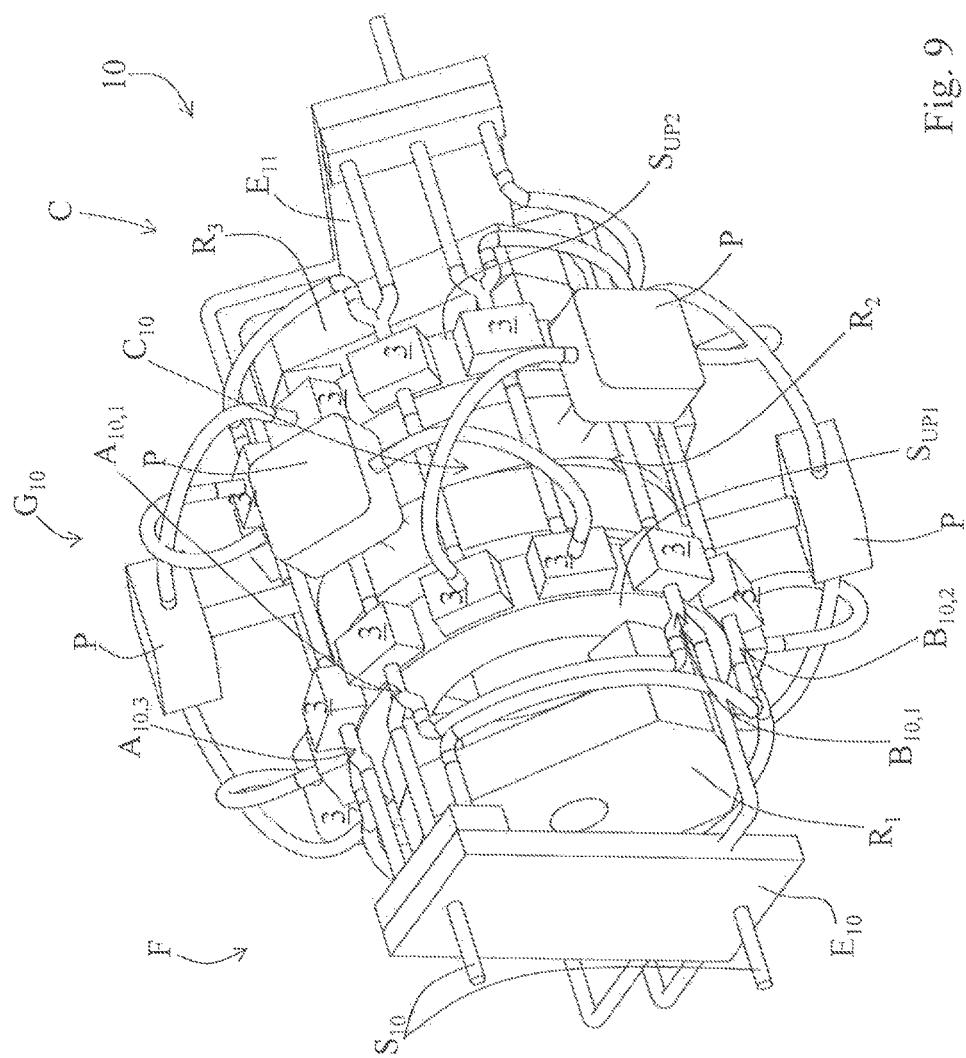

THERMAL APPLIANCE AND METHOD FOR OPTIMIZING THE HEAT EXCHANGE THEREOF

TECHNICAL SCOPE

This invention relates to a thermal appliance comprising an uneven number of N closed primary circuits comprising each at least two outlet points connected in series to at least one heat exchange zone through which a secondary fluid circulates, an operating device that displaces a heat transfer fluid called primary fluid in said primary circuits in an alternating cycle of period T comprising two displacement phases of a half-period T/2, said phases corresponding to two primary fluid displacements generating identical flow rate and volume profiles but in opposite directions.

It also relates to a method for optimizing the heat exchange of a thermal appliance comprising an uneven number of N closed primary circuits comprising each at least two outlet points connected in series to at least one heat exchange zone through which a secondary fluid circulates, said method consisting in displacing a heat transfer fluid called primary fluid in said primary circuits in an alternating cycle of period T comprising two displacement phases of a half-period T/2, said phases corresponding to two primary fluid displacements generating identical flow rate and volume profiles but in opposite directions.

PRIOR ART

A thermal appliance must be able to exchange the thermal energy it produces with an external application. Such exchange is generally achieved by a heat exchanger preferably designed in order to perform an optimal heat exchange. In the case of thermal appliances whose primary fluid, that is to say the heat transfer fluid that transports the thermal energy produced by the thermal appliance, is displaced in an alternating or alternated reciprocating movement, the efficiency of the heat exchange between the primary fluid and the fluid of the external application called secondary fluid is problematic because of the change of direction of circulation of the primary fluid. In fact, this inversion of the direction of circulation of the primary fluid results on the one hand in a heat exchange that is sometimes countercurrent and sometimes co-current and, on the other hand, in a non-constant and jerky displacement of the primary fluid in the heat exchanger and in an inversion of the temperatures at the inlets/outlets of the primary circuits, so that the heat exchange is not optimal.

For the purpose of this invention, an alternated or alternating displacement of the primary fluid corresponds to a displacement with a regular change of direction of circulation, that is to say with back and forth movements. This is in particular the case in the magnetocaloric thermal appliances in which the primary fluid is displaced in a reciprocating movement through magnetocaloric material so as to set up there a thermal gradient.

These thermal appliances use the magnetocaloric effect (MCE) of certain materials, which consists in a variation of their temperature when they are subjected to a magnetic field. In such appliances, the magnetocaloric materials are subjected to a succession of magnetization and demagnetization phases and a heat exchange is performed with a primary heat transfer fluid in order to achieve the widest temperature variation possible in these materials (temperature gradient). For that purpose, the circulation of the primary fluid is alternated and this primary fluid circulates in channels or pores passing through the magnetocaloric material. A magnetocaloric cycle comprises two phases, that is to say a magnetization phase and a demagnetization phase, which translates in energy available at every phase. This cycle is repeated up to frequencies of several Hertz. During these phases, the primary fluid flows through the magnetocaloric material and will either heat up at the contact of the material during a so-called magnetization phase, or cool down at the contact of the material during a so-called demagnetization phase.

Therefore, in the thermal appliances using a reciprocating primary flow, the heat exchange with the secondary fluid strongly depends on the frequency of the changes of direction of circulation, as well as on the temperature of the primary fluid. This phenomenon is amplified in the magnetocaloric thermal appliances in which the displaced primary heat transfer fluid performs the heat exchange either with a magnetocaloric material having undergone heating, or with a magnetocaloric material having undergone cooling. Since the primary heat transfer fluid performs a reciprocating movement, the primary fluid stops in the heat exchanger every time the direction of circulation changes. These stops have a negative effect on the efficiency of the heat exchanger, as the steady-state displacement operation does not establish itself and the heat exchange in the exchanger is not stable, so that the influence of the ambient temperature is increased and leads to thermal losses.

To exploit optimally the power of a thermal appliance, it is thus necessary to have heat exchange characteristics between the primary circuit and the secondary circuit that be improved, optimized, and as constant as possible. As explained above, mastering the heat exchanges of the primary circuit of a thermal appliance with a secondary circuit is problematic in the case of a primary circuit using a sequential reciprocating and discontinuous displacement of the primary fluid.

DESCRIPTION OF THE INVENTION

The present invention aims to overcome these disadvantages by offering a thermal appliance in which the thermal energy transfer between the primary fluid and the secondary fluid of one or several external applications is optimized by limiting the flow rate variation of the primary fluid in the heat exchange zone so as to reduce as much as possible the idle times in the heat exchanger.

To that purpose, the invention relates to a thermal appliance of the kind described in the preamble, characterized in that the operating device is arranged so that the start of the cycle of the primary fluid is phase-shifted by T/2N between each of said primary circuits, in that the inlet of said exchange zone is connected unidirectionally to a first set comprising a first group of outlet points of said primary circuits whose exiting primary fluid flow rate components are phase-shifted by T/N with respect to each other and in that the outlet of the exchange zone is connected unidirectionally to a second set comprising a second group of outlet points of said primary circuits whose exiting primary fluid flow rate components are also phase-shifted by T/N with respect to each other and phase-shifted by T/2 with respect to the primary fluid flow rate components exiting the outlet points of said first set, so that the sum of the heat transfer fluid flow rates of the first set entering said exchange zone is always greater than zero.

Such measure allows ensuring that primary fluid is constantly in movement in the heat exchanger and therefore tending towards the most stable primary fluid flow rate possible and thus towards a steady-state operation that optimizes the heat exchange between the primary fluid and the secondary fluid.

The first set of points can comprise one of the outlet points of each of said primary circuits and the second set of points can comprise the other outlet points.

To achieve the unidirectional fluidic connection between an outlet point and the corresponding exchange zone, a control device of the check valve type or any similar device achieving the same function, that is to say, let the fluid flow only in one direction, and prevent it from circulating in the opposite direction, such as for example hydraulic valves controlled electrically or by a pressure differential can be integrated in the conduit ensuring the fluidic communication. Therefore, according to the direction of circulation of the primary fluid, primary fluid will be liable to circulate in a given connection during a half-period T/2 and, during the other half-period, there will be no fluid displacement in said connection.

To achieve heat exchange over the whole displacement period of the primary fluid, the thermal appliance can also comprise an exchange zone whose outlet is connected unidirectionally to the outlet points of the first set and whose inlet is connected unidirectionally to the outlet points of the second set.

According to a first variant, said primary circuits can join in a common conduit in said exchange zone.

According to another variant, said primary circuits can be connected to separate conduits in said exchange zone.

To optimize further the efficiency of the appliance, said exchange zone can be arranged so that the primary fluid and the secondary fluid flow countercurrent with respect to each other.

The operating device of the primary fluid in the primary circuits can comprise a control cam moving pistons and the profile of said cam can be such that it determines in each primary circuit a displacement of the heat transfer fluid according to a periodic movement of period T.

The cam profile can preferably determine the displacements of the pistons so that the primary fluid is displaced in said primary circuits successively according to:
  i) a linearly increasing positive flow rate for a duration corresponding to T/2N,
  ii) then a constant positive flow rate for a duration corresponding to (N−2)T/2N,
  iii) then a linearly decreasing positive flow rate for a duration corresponding to T/2N,
  iv) then a linearly decreasing negative flow rate for a duration corresponding to T/2N,
  v) then a constant negative flow rate for a duration corresponding to (N−2)T/2N,
  vi) then a linearly increasing negative flow rate for a duration corresponding to T/2N.

Such a flow rate profile allows achieving a constant primary fluid flow rate in the exchange zone.

Moreover, an appliance according to the invention shows an improved efficiency at the level of the exchange zones when it comprises an uneven number of primary circuits. The appliance can so preferably comprise three primary circuits.

The primary circuits of the thermal appliance according to the invention can comprise each four outlet points connected two by two by at least two exchange zones. The thermal appliance can comprise four outlet points connected two by two by at least two exchange zones.

The operating device of the primary fluid in the primary circuits can comprise at least one control cam moving pistons and the control cam can comprise a profile arranged so as to determine in each primary circuit a displacement of the primary fluid according to a periodic reciprocating movement of period T.

Each primary circuit can moreover comprise at least one magnetocaloric element through which passes said primary fluid, and said thermal appliance can comprise a magnetic arrangement arranged to subject alternately said magnetocaloric element to a magnetic field variation and create alternately in said magnetocaloric element a heating phase and a cooling phase.

The invention also relates to a method for optimizing the heat exchange as described in the preamble, characterized in that it moreover consists in phase-shifting by T/2N the start of the primary fluid cycle between each of said primary circuits, in connecting unidirectionally the inlet of said exchange zone to a first set comprising a first group of outlet points of said primary circuits whose exiting primary fluid flow rate components are phase-shifted by T/N with respect to each other and in connecting unidirectionally the outlet of the exchange zone to a second set comprising a second group of outlet points of said primary circuits whose exiting primary fluid flow rate components are also phase-shifted by T/N with respect to each other and phase-shifted by T/2 with respect to the primary fluid flow rate components exiting the outlet points of said first set, so that the sum of the heat transfer fluid flow rates of the first set entering said exchange zone is always greater than zero.

This method can in particular consist in optimizing the heat exchange of a thermal appliance according to the invention.

BRIEF DESCRIPTION OF THE DRAWINGS

The present invention and its advantages will be better revealed in the following description of several embodiment variants given as non limiting examples, in reference to the drawings in appendix, in which:

FIG. 2 represents the flow rate of the primary fluid in the three primary circuits of FIG. 1, during a period T corresponding to 6 seconds, FIG. 3 represents the positive component of the primary fluid flow rate exiting three outlet points of the primary circuits of FIG. 1, during period T of 6 seconds, FIG. 9 represents a thermal appliance realized according to the variant illustrated in FIG. 1.

ILLUSTRATIONS OF THE INVENTION AND VARIOUS WAYS OF REALIZING IT

In the illustrated embodiment examples, the identical elements or parts have the same numerical references.

The invention is not restricted to a specific type of thermal apparatus. It relates to any thermal apparatus comprising a heat transfer fluid called primary fluid displaced according to a reciprocating movement intended to transport thermal energy produced by the thermal appliance to transfer it by heat exchange to another heat transfer fluid called secondary fluid. The primary fluid and the secondary fluid are preferably liquids. Moreover, the primary fluid is preferably incompressible and the secondary fluid is preferably displaced continuously by a pump or any similar means for cooling, heating or tempering an external application.

The thermal appliances 10, 20, 30, 40 represented comprise an appliance core referenced $G_{10}$, $G_{20}$, $G_{30}$, $G_{40}$, comprising at least three primary circuits $P_{10,i}$, $P_{20,i}$, $P_{30,i}$, $P_{40,i}$ in which a heat transfer fluid called primary fluid circulates according to an alternating or bidirectional displacement. The thermal energy is produced in core $G_{10}$, $G_{20}$, $G_{30}$, $G_{40}$ of the appliance. The primary fluid performs successive back-and-forth motions in two opposite directions of circulation in primary circuit $P_{10,i}$, $P_{20,i}$, $P_{30,i}$, $P_{40,i}$. This back-and-forth motion can be achieved for example with a piston P moved by a control cam profile $C_{10}$. Such piston can be rigid or deformable such as for example a membrane. Of course, any other means able to displace the primary fluid may be used. Moreover, the displacement of the piston or similar can be controlled by an operating device that can be a cam, a magnetic device, a linear motor or any equivalent means able to move said piston back and forth.

Figure 1:
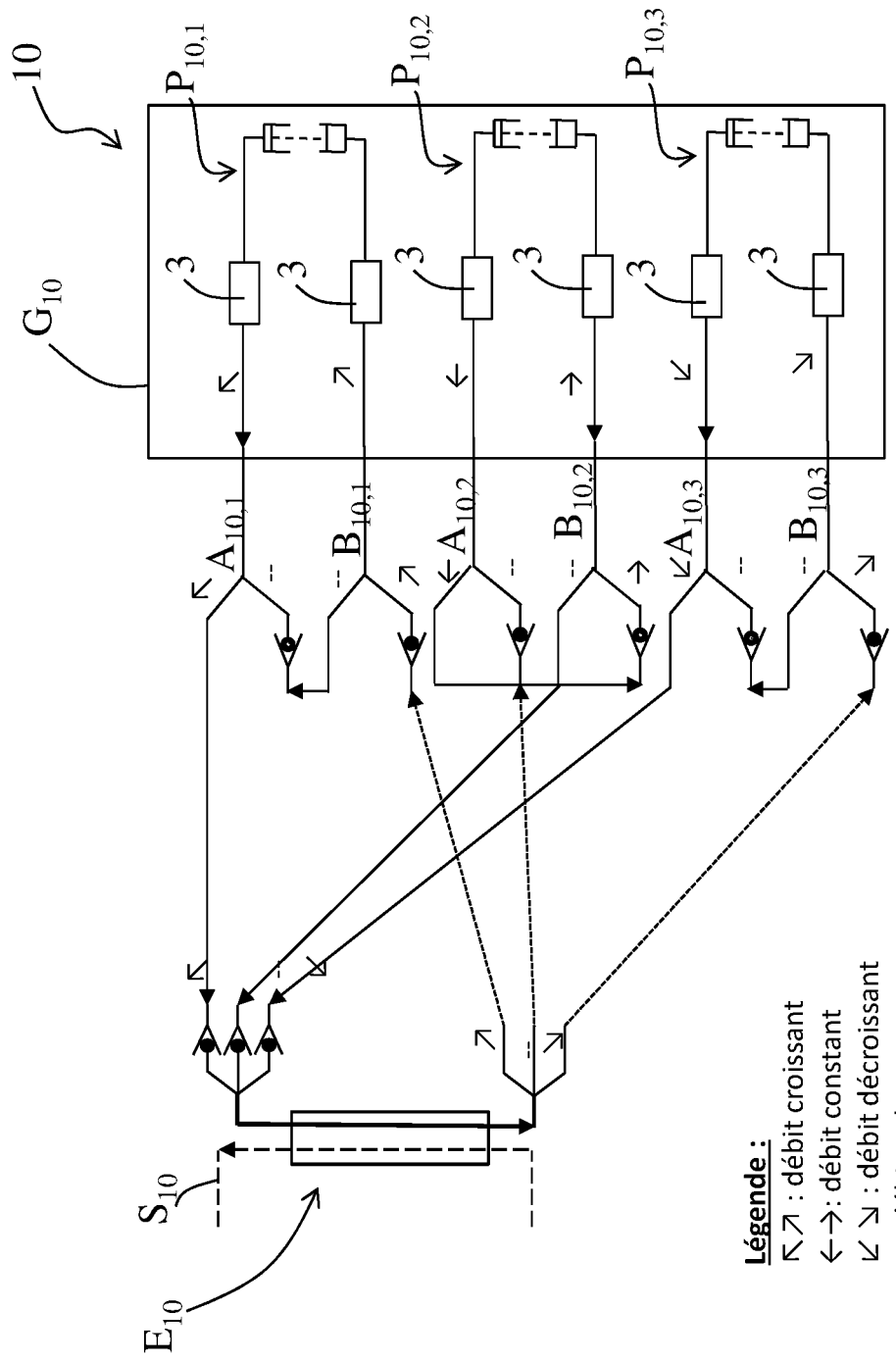
FIG. 1 represents three primary circuits of a thermal appliance according to the invention and an exchange zone allowing a heat exchange with a secondary circuit.

In the diagram of FIG. 1, as well as in the other diagrams, the primary circuits $P_{10,i}$, $P_{20,i}$, $P_{30,i}$, $P_{40,i}$ are represented very schematically. They can in particular comprise other, non represented elements such as for example seals, channels, fluid diffusion or distribution systems, etc. Primary circuits $P_{10,i}$, $P_{20,i}$, $P_{30,i}$, $P_{40,i}$ are preferably closed and with a constant volume.

Figures 4, 5:
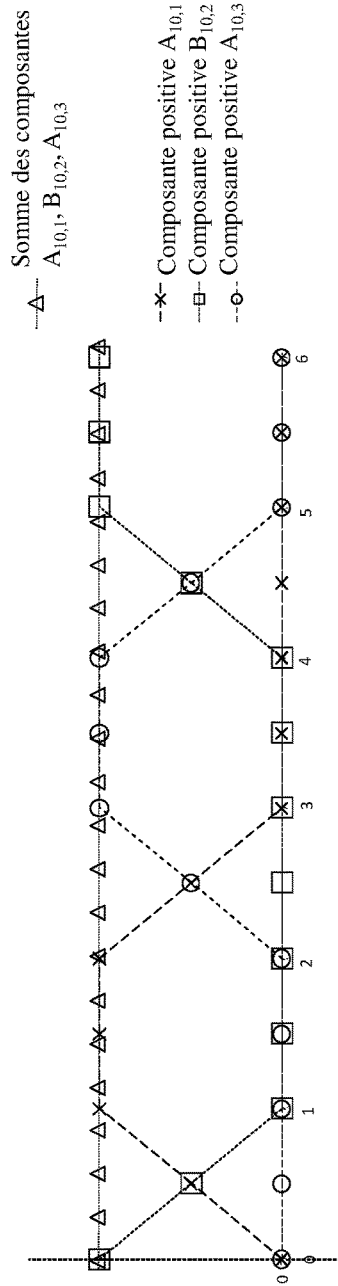
FIG. 4 represents the positive component of the primary fluid flow rate exiting three other outlet points of the primary circuits of FIG. 1, connected to the exchange zone, during period T of 6 seconds.
FIG. 5 is a table showing the positive components of the flow rate exiting the various outlet points during a period T, as well as the sum of the corresponding flow rates for three outlet points.

The arrows of the attached figures illustrate the direction of circulation of the primary fluid and of the secondary fluid in thermal appliances 10, 20, 30, 40 at a given moment according to the diagram of FIG. 4.

In each primary circuit $P_{10,i}$, $P_{20,i}$, $P_{30,i}$, $P_{40,i}$, the primary fluid is displaced according to a same alternating reciprocating movement of period T, according to identical flow rate and volume profiles, apart from the mechanical dispersions. This alternating movement can possibly comprise one or several stop moments during which the primary fluid is not displaced. The displacement of the heat transfer fluid takes place according to an identical movement in each primary circuit $P_{10,i}$, $P_{20,i}$, $P_{30,i}$, $P_{40,i}$, including a displacement in one direction during a half-period T and a displacement in the opposite direction during the other half-period T. Even though the flow rate profile of the primary fluid is identical in all primary circuits, it is phase-shifted with respect to each other by a period of T/2N, N being the number of primary circuits. In addition, each primary circuit $P_{10,i}$, $P_{20,i}$, $P_{30,i}$, $P_{40,i}$ comprises at least two outlet points connected to each other by at least one heat exchange zone $E_{10}$, $E_{20}$, $E_{30,1}$, $E_{30,2}$, $E_{40,1}$, $E_{40,2}$, $E'_{40,1}$, $E'_{40,2}$ at the level of said outlet points $A_{10,1}$, $A_{10,2}$, $A_{10,3}$, $B_{10,1}$, $B_{10,2}$, $B_{10,3}$, $A_{20,1}$, $A_{20,2}$, $A_{20,3}$, $B_{20,1}$, $B_{20,2}$, $B_{20,3}$; $A_{30,1}$, $A_{30,2}$, $A_{30,3}$; $B_{30,1}$, $B_{30,2}$, $B_{30,3}$; $A_{40,1}$, $A_{40,2}$, $A_{40,3}$, $B_{40,1}$, $B_{40,2}$, $B_{40,3}$; $A'_{40,1}$, $A'_{40,2}$, $A'_{40,3}$, $B'_{40,1}$, $B'_{40,2}$, $B'_{40,3}$. The fluidic connection between an outlet point of a primary circuit and the inlet of an exchange zone or between the outlet of an exchange zone and the outlet point of a primary circuit is unidirectional. To that purpose, the fluidic connections with the inlet of an exchange zone comprise a means that allows fluid circulation only from the corresponding outlet point of the primary circuit towards the corresponding inlet, and the fluidic connections with the outlet of an exchange zone comprise a means that allows fluid circulation only from the outlet of the exchange zone towards a corresponding outlet point of the primary circuit. Such means for controlling the direction of circulation of the primary fluid can for example be made of a check valve or similar.

The displacement of the primary fluid is achieved according to a back-and-forth movement during a period T, so that the primary fluid coming from a primary circuit $P_{10,i}$, $P_{20,i}$, $P_{30,i}$, $P_{40,i}$ can be directed towards an exchange zone $E_{10}$, $E_{20}$, $E_{30,1}$, $E_{30,2}$, $E_{40,1}$, $E_{40,2}$, $E'_{40,1}$, $E'_{40,2}$ only during a half-period T/2, the period during which the exiting component of the primary fluid flow rate profile at the corresponding outlet point is positive and provided the fluidic connection with the exchange zone is possible in this direction. The presence of a check valve or of any other means allowing to let fluid pass in a pipe only when it flows in a predefined direction allows making possible or impossible the fluidic connection with a corresponding exchange zone. The components of the flow rate profile of the primary fluid exiting the outlet points connected with each other by an exchange zone are therefore phase-shifted by T/2N.

So the component of the flow rate profile of the primary fluid exiting an outlet point is zero during one of the two displacement phases of the primary fluid and is phase-shifted by T/2 with respect to the component of the primary fluid flow rate exiting the other outlet point to which it is connected by an exchange zone.

As already indicated, the primary circuits $P_{10,i}$, $P_{20,i}$, $P_{30,i}$, $P_{40,i}$ of a thermal appliance 10, 20, 30, 40 according to the invention present a phase-shift of T/2N between each other with regard to the displacement or drive of the primary fluid. This is particularly visible in FIG. 2 representing the primary fluid flow rate in each primary circuit $P_{10,1}$, $P_{10,2}$, $P_{10,3}$ during a period T corresponding to 6 seconds in a thermal appliance comprising three primary circuits $P_{10,1}$, $P_{10,2}$, $P_{10,3}$, such as that schematically illustrated in FIG. 1. The thermal appliances 20, 30, 40 of FIGS. 6, 7 and 8 comprise the same flow rate profile. The flow rate represented is the one that corresponds to the outlet component at outlet points $A_{10,1}$, $A_{10,2}$ and $A_{10,3}$. At these outlet points, the fluidic phase-shift between every primary circuit $P_{10,1}$, $P_{10,2}$, $P_{10,3}$ therefore corresponds to T/2N=6/(2×3) and is equal to 1 second.

FIG. 3 represents the positive exiting component at these outlet points $A_{10,1}$, $A_{10,2}$ and $A_{10,3}$ during period T. It can be noted that, during a period T, fluid is not constantly exiting said outlet points $A_{10,1}$, $A_{10,2}$ and $A_{10,3}$. Now, this is equivalent to a duration during which there is no primary fluid movement in the exchange zone, which is detrimental to the heat exchange between the primary fluid and the secondary fluid.

This duration during which there is no primary fluid displacement in the exchange zone can also be identified in the table of FIG. 5. This table represents the positive flow rate components exiting outlet points $A_{10,1}$, $A_{10,2}$, $A_{10,3}$, $B_{10,1}$, $B_{10,2}$, $B_{10,3}$, as well as their sum during period T. Value 1 corresponds to the presence of a positive flow rate, that is to say that primary fluid is exiting the corresponding outlet point towards the exchange zone. Value 0 corresponds to the absence of a positive flow rate, that is to say that there is no primary fluid exiting the outlet point and flowing towards the exchange zone, since the primary fluid is flowing in the other direction. So, the flow rate profile exiting outlet points $A_{10,1}$, $A_{10,2}$ and $A_{10,3}$ is identified by the values surrounded by a rectangle with rounded corners and is zero during the last second of the period. This results in destabilizing the heat exchange in the exchange zone and in increasing the influence of the ambient temperature on this exchange, leading therefore to thermal losses.

The invention allows avoiding such detrimental effect by selecting the outlet points to be connected to the inlet and to the outlet of the exchange zone(s) so that the primary fluid flow rate in said exchange zone is the most constant possible and, in any case, never zero.

So the invention provides to connect to the inlet of exchange zone $E_{10}$, $E_{20}$, $E_{30}$, $E_{40}$, $E'_{40}$ the outlet points phase-shifted by a period of T/N, that is to say phase-shifted by 6/3=2 seconds in the example described in reference to FIGS. 1 and 2. To that purpose, FIG. 4 represents the positive exiting component at outlet points $A_{10,1}$, $B_{10,2}$ and $A_{10,3}$ during period T, corresponding to the appliance diagram represented in FIG. 1. It can be noted that there is always primary fluid exiting at least one of said outlet points $A_{10,1}$, $B_{10,2}$ and $A_{10,3}$ over a 6-seconds period. Hence, there is always primary fluid in movement in exchange zone $E_{10}$, which allows achieving quasi-permanent heat exchange in exchange zone $E_{10}$. This appears in the flow rate values surrounded by an ellipse in the table illustrated in FIG. 5, which are constantly positive and non-zero, equal to 1 or 2. This is of course the case for all of the thermal appliances described in this application.

Moreover, the primary fluid flow rate form or profile illustrated in FIG. 2 in relation with the specific connection of the different primary circuits to the exchange zones is particularly advantageous as it allows achieving a constant flow rate in said exchange zones, which furthers the heat exchange between the primary circuits and the secondary circuit in said exchange zones. This flow rate form is as follows:
 i) an increasing flow rate for a duration of T/2N=6/(2×3)=1 second, then
 ii) a constant flow rate for a duration of (N−2)T/2N=(3−2)×6/(2×3)=1 second,
 iii) then a decreasing flow rate for a duration of T/2N=6/(2×3)=1 second, then
 iv) a linearly decreasing negative flow rate for a duration corresponding to T/2N=1 second, then
 v) a constant negative flow rate for a duration corresponding to (N−2)T/2N=1 second,
 vi) and finally a linearly increasing negative flow rate for a duration corresponding to T/2N=1 second.

For the purpose of this invention a negative flow rate is to be understood so that, at a considered outlet point, the fluid exiting this outlet point flows in the direction opposite to the exchange zone said outlet point is connected to. Therefore, the flow rate is positive when the primary fluid flows from the outlet point towards the exchange zone.

In such configuration, with three primary circuits and a same absolute value for the slope of the increasing flow rate profile and for the slope of the decreasing flow rate profile, the sum of the primary fluid flow rates entering an exchange zone is constant and this total flow rate corresponds to the maximum flow rate in the primary circuits in an appliance comprising three primary circuits. This appears in the curve of the sum of the flow rate components of outlet points $A_{10,1}$, $B_{10,2}$, $A_{10,3}$, which is horizontal, that is to say constant, in FIG. 4.

Experience has shown that this total flow rate corresponds to the double of the maximum flow rate in a thermal appliance comprising five primary circuits and to three times the maximum flow rate in an appliance comprising seven primary circuits, while remaining constantly constant, and therefore designed for an optimal exchange in the corresponding exchange zone.

Of course, other flow rate profiles can be achieved in the primary circuits. These other profiles, associated with the specific configuration according to the invention, will allow obtaining constantly a fluid displacement in the exchange zones. In other word, there will always be primary fluid flowing in the exchange zone, without stoppage or dead zone. This is important in order to ensure a good heat exchange between the primary fluid of the thermal appliance and the secondary fluid of an external application.

Thermal appliance 10 represented in FIG. 1 corresponds to a first embodiment variant wherein thermal appliance 10 comprises one exchange zone $E_{10}$ in which the secondary fluid of secondary circuit $S_{10}$ performs a heat exchange with the primary fluid. To that purpose, in exchange zone $E_{10}$, the primary fluid coming from the primary circuits is collected in one single conduit or channel in exchange zone $E_{10}$. In this configuration, there is no primary fluid stagnating in exchange zone $E_{10}$.

The circulation of the primary fluid and that of the secondary fluid are preferably countercurrent so as to facilitate the heat exchange between them. In the configuration represented in FIG. 1, the heat exchange occurs only during a half-period T/2 of each primary circuit. It is of course possible to achieve a heat exchange over the whole period T. This is in particular illustrated in the example of FIGS. 7 and 8.

Figure 6:
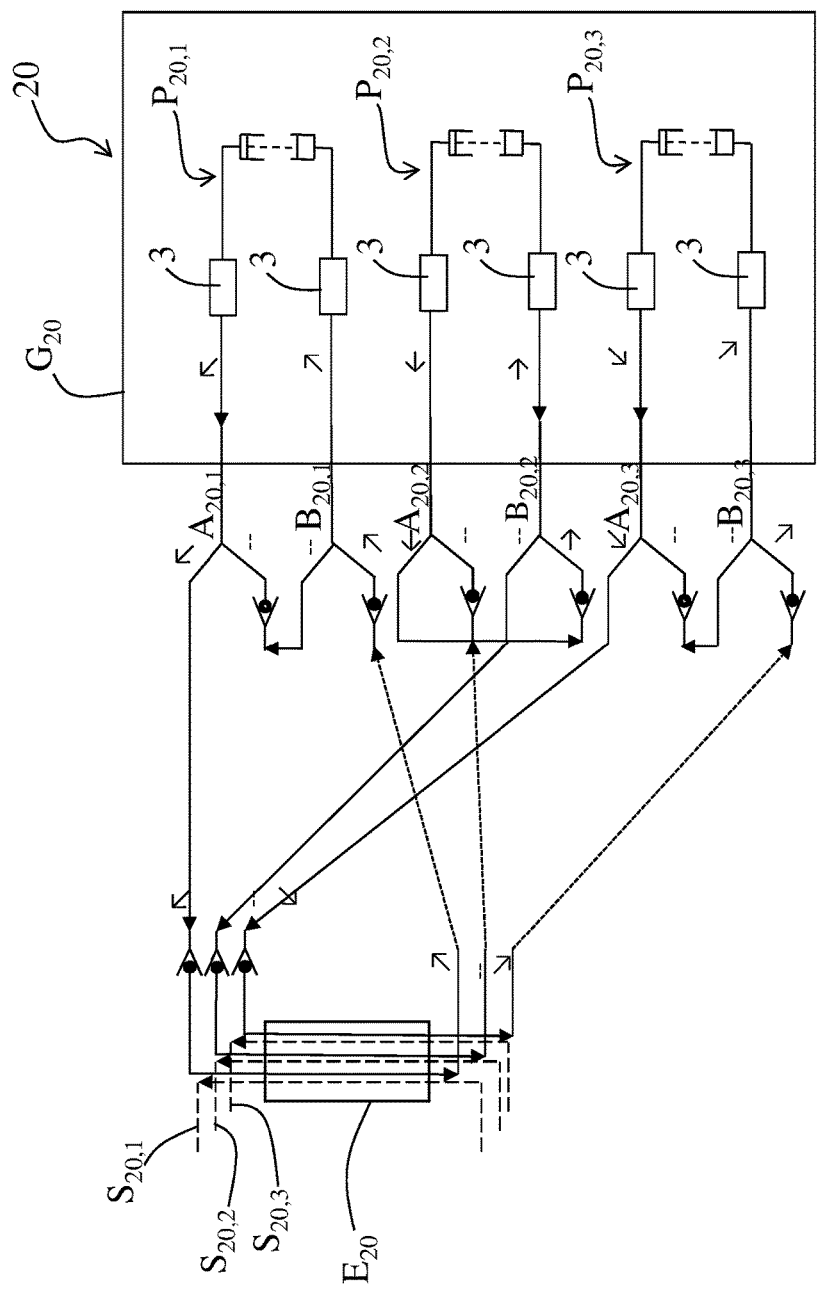
FIG. 6 is a schematic view of a thermal appliance in which the exchange zone is embodied according to a variant of the invention.

The thermal appliance 20 represented in FIG. 6 is another embodiment variant that differs from thermal appliance 10 of FIG. 1 by the configuration of the heat exchange between primary circuits $P_{20,1}$, $P_{20,1}$, $P_{20,3}$ and secondary circuit $S_{20,1}$, $S_{20,2}$, $S_{20,3}$ in exchange zone $E_{20}$. In fact, in this thermal appliance 20, the fluid of each primary circuit $P_{20,1}$, $P_{20,2}$, $P_{20,3}$ enters a separate and dedicated conduit in exchange zone $E_{20}$ and performs heat exchange with a corresponding portion $S_{20,1}$, $S_{20,2}$, $S_{20,3}$ of a secondary circuit, forming heat exchange pairs. Such configuration with a separation of the primary circuits in exchange zone $E_{20}$ allows simplifying or lightening the hydraulic connection, in particular as it requires less devices to control the direction of circulation of the heat transfer fluid. Even though the flow rate of the primary fluid is zero during a half-period in each primary circuit portion inside of the exchange zone, there is constantly at least one of the primary circuit portions in the exchange zone showing a non-zero flow rate, so that the thermal gain is ensured thanks to the thermal conductivity between the different pairs of primary circuit and secondary circuit portions. It is therefore important in such configuration not to insulate thermally the different heat exchange pairs with respect to each other.

Figure 7:
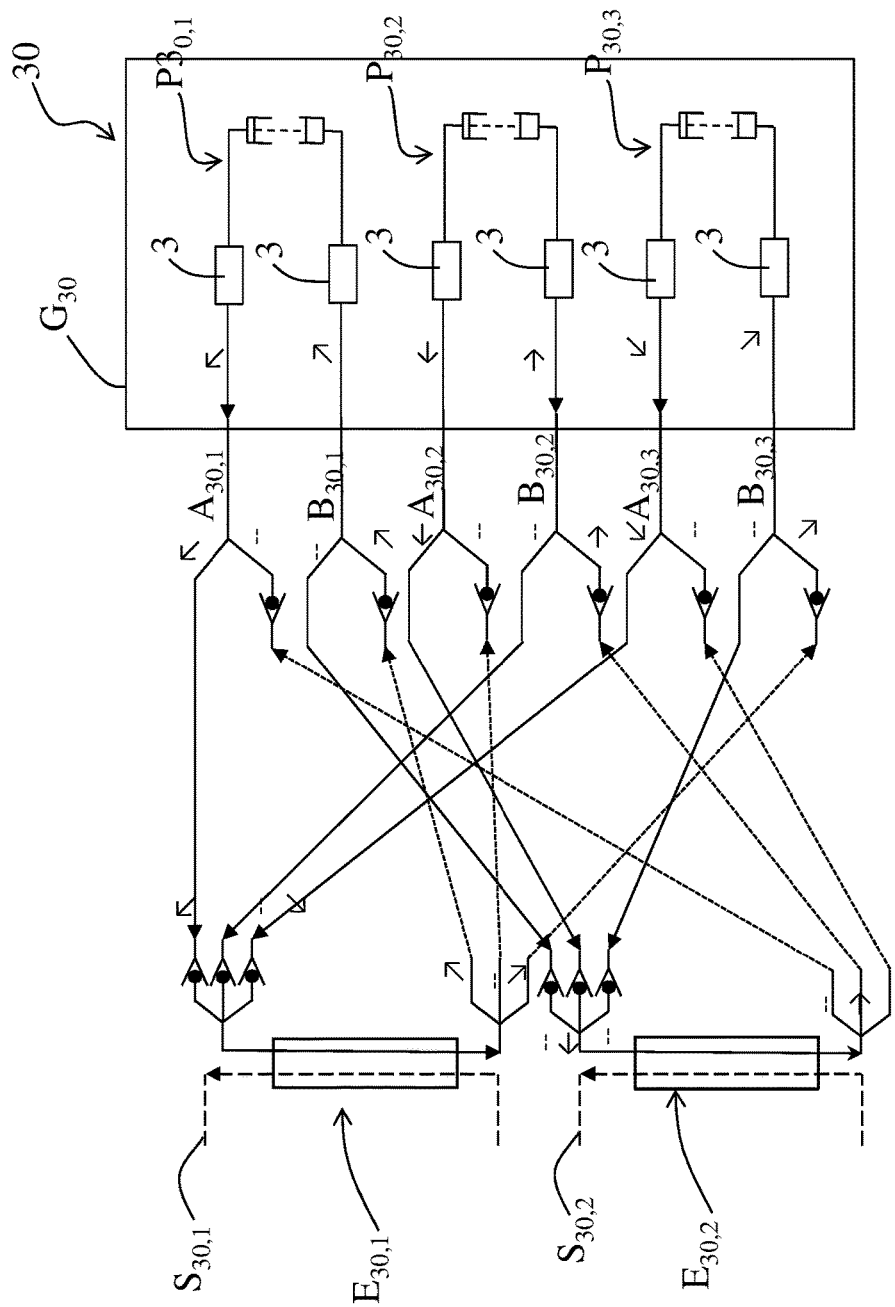
FIG. 7 is a schematic view of a thermal appliance according to the invention in which the primary circuits are connected to two exchange zones.

Thermal appliance 30 illustrated in FIG. 7 is another embodiment variant that allows achieving heat exchange with a secondary circuit over the whole period T. To that purpose, it comprises two exchange zones $E_{30,1}$ and $E_{30,2}$. The inlet of the first exchange zone $E_{30,1}$ is connected to the first outlet points group $A_{30,1}$, $B_{30,2}$, $A_{30,3}$ and its outlet to the second outlet points group $B_{30,1}$, $A_{30,2}$, $B_{30,3}$. On the other hand, the inlet of the second exchange zone $E_{30,2}$ is connected to the second outlet points group $B_{30,1}$, $A_{30,2}$, $B_{30,3}$ and its outlet is connected to the first outlet points group $A_{30,1}$, $B_{30,2}$, $A_{30,3}$. This way, all positive primary fluid flow rate components that exit the different outlet points $A_{30,1}$, $B_{30,3}$, $A_{30,3}$, $B_{30,1}$, $A_{30,2}$, $B_{30,3}$ are used to achieve a heat exchange with a secondary fluid. In thermal appliance 30 illustrated in this example, the fluid coming from the different primary circuits $P_{30,1}$, $P_{30,2}$, $P_{30,3}$ is collected in a common conduit in each of exchange zones $E_{30,1}$, $E_{30,2}$. The invention however does not exclude a variant wherein the primary fluid coming from every primary circuit $P_{30,1}$, $P_{30,2}$, $P_{30,3}$ circulates in a separate conduit in the exchange zone, as this is the case in thermal appliance 20 of FIG. 6. A configuration with two exchange zones $E_{30,1}$ and $E_{30,2}$ allows achieving a symmetrical heat exchange in the primary circuits and all along the displacement cycle of the primary fluid.

Exchange zones $E_{10}$, $E_{20}$, $E_{30,1}$, $E_{30,2}$, $E_{40,1}$, $E_{40,2}$, $E'_{40,1}$, $E'_{40,2}$, in which the primary and secondary fluids flow preferably longitudinally with respect to each other can be formed by a heat exchanger whose exchange circuits integrate a part of secondary circuit $S_{10}$, $S_{20,1}$, $S_{20,2}$, $S_{20,3}$, $S_{30,1}$, $S_{30,2}$, $S_{40,1}$, $S_{40,2}$, $S'_{40,1}$, $S'_{40,2}$, in which a secondary fluid circulates, and the unidirectional primary circuit conduit(s) or portion(s). The invention does not prejudge the structural configuration of these heat exchangers, which can be plate exchangers, tubular exchangers or any other kind of heat exchangers.

The invention does not prejudge the way the thermal energy is obtained in the core of thermal appliances 10, 20, 30, 40. However, the invention is particularly suitable for magnetocaloric thermal appliances in which the thermal energy is obtained in the core of the thermal appliance by exploiting the magnetocaloric effect of so-called magnetocaloric effect materials. To that purpose, the components identified by reference 3 in the appliances described in this invention can be magnetocaloric elements. These magnetocaloric elements 3 are represented schematically and the primary fluid of primary circuits $P_{10,i}$, $P_{20,i}$, $P_{30,i}$, $P_{40,i}$ flows through them.

Every magnetocaloric element 3 can be made of one or several magnetocaloric materials through which the primary fluid can flow. To that purpose, said magnetocaloric materials can be porous so that their pores form through fluid passages. They can also have the form of a solid block in which mini or micro channels are machined, molded or extruded, or they can be made of an assembly of superposed, possibly grooved plates, between which the heat transfer fluid can flow. They can also have the form of powder or particles, so that the gaps form fluid passages. Any other embodiment allowing the primary fluid to perform heat exchange with every magnetocaloric element 3 may of course be suitable. A particular configuration can thus comprise a magnetocaloric element in the form of a blade through which the primary fluid does not flow, but which is in thermal contact with said primary fluid circulating for example in two opposite directions on the upper and lower surfaces of this blade, so as to exit every time at one of the ends of said blade forming the ends of the thermal module including this blade. In a rotary thermal appliance configuration, the thermal element can have the shape of a disk containing the magnetocaloric material, for example in the form of stacked blades spaced to form between them passage channels for the primary fluid.

In this kind of thermal appliance, a magnetic arrangement comprising permanent magnets or similar is provided, which is moved with respect to magnetocaloric elements 3 to subject them alternately to a magnetic field variation and create alternately in magnetocaloric elements 3 a heating phase and a cooling phase. This magnetic arrangement can also have the form of a sequentially powered electromagnet or of any other similar means liable to generate a magnetic field variation. In this case, the inversions of the direction of circulation of the primary fluid in primary circuit $P_{10,i}$, $P_{20,i}$, $P_{30,i}$, $P_{40,i}$ are synchronized with the magnetization and demagnetization phases of magnetocaloric elements 3 in order to set up a temperature gradient as high as possible in magnetocaloric elements 3. This synchronization can be identical to that described in the patent application of the applicant published under number WO 2010/046559.

Of course, the magnetocaloric thermal appliance can comprise a number of magnetocaloric elements 3 different from what is represented in the attached figures.

Figure 8:
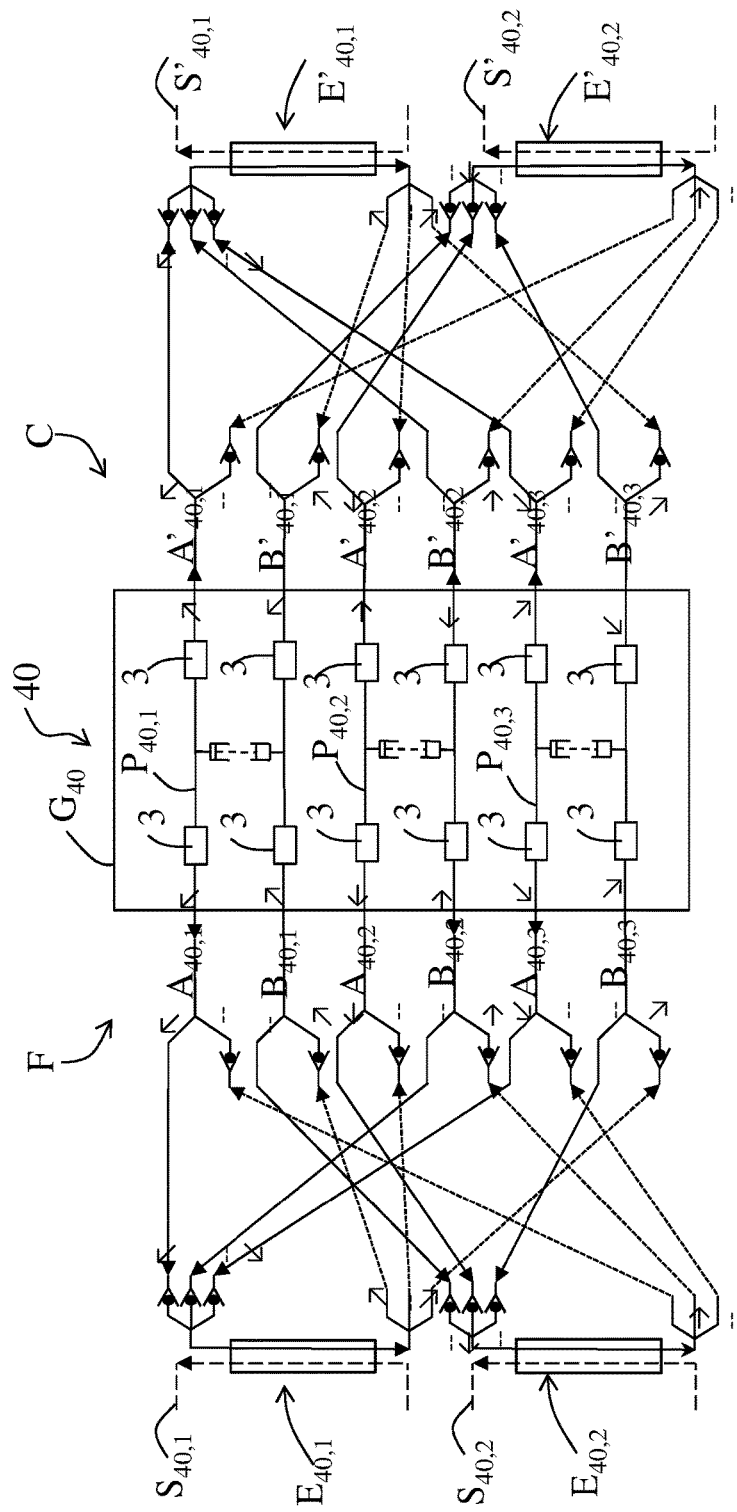
FIG. 8 represents schematically a primary circuit of a thermal appliance according to the invention, comprising four ends connected to two exchange zones.

FIG. 8 represents a preferred variant of a magnetocaloric thermal appliance 40 according to the invention. The thermal appliance comprises three primary circuits $P_{40,1}$, $P_{40,2}$, $P_{40,3}$. The primary fluid flow rate profile in these primary circuits $P_{40,1}$, $P_{40,2}$, $P_{40,3}$ is as that described in reference to FIG. 2. Each primary circuit $P_{40,1}$, $P_{40,2}$, $P_{40,3}$ comprises four outlet points connected two by two by at least one heat exchange zone $E_{40,1}$, $E_{40,2}$, $E'_{40,1}$, $E'_{40,2}$. Thus, a heat exchange takes place on both sides of core $G_{40}$ of thermal appliance 40, that is to say at the level of hot side C located on the right on FIG. 8 and corresponding to exchange zones $E'_{40,1}$ and $E'_{40,2}$ and at the level of cold side F located on the left on FIG. 8 and corresponding to exchange zones $E_{40,1}$ and $E_{40,2}$. Moreover, the represented configuration allows achieving a continuous exchange over the whole period T of displacement of the primary fluid because each primary circuit $P_{40,1}$, $P_{40,2}$, $P_{40,3}$ is connected to two exchange zones $S_{40,1}$, $S_{40,2}$ and $S'_{40,1}$, $S'_{40,2}$.

Thus, the inlet of heat exchange zone $E_{40,1}$ located on cold side F is connected to a first set of outlet points $A_{40,1}$, $B_{40,2}$, $A_{40,3}$ for which the primary fluid flow rate component is every time phase-shifted by T/N, that is to say by 6/3, which is equal to 2 seconds for this example. The outlet of this heat exchange zone $E_{40,1}$ is connected to a second set of outlet points $B_{40,1}$, $A_{40,2}$, $B_{40,3}$ for which the primary fluid flow rate component is also phase-shifted every time by 2 seconds and by a half-period T/2 with respect to the first set of outlet points. The second exchange zone $E_{40,2}$ located on cold side F is connected to the same outlet points $A_{40,1}$, $B_{40,2}$, $A_{40,3}$, $B_{40,1}$, $A_{40,2}$, $B_{40,3}$ as exchange zone $E_{40,1}$, but in a reversed way. Thus, the inlet of exchange zone $E_{40,2}$ is connected to the second set comprising outlet points $B_{40,1}$, $A_{40,2}$, $B_{40,3}$ and its outlet is connected to the first set comprising outlet points $A_{40,1}$, $B_{40,2}$, $A_{40,3}$. The same applies to the two heat exchange zones $E'_{40,1}$ and $E'_{40,2}$ located on hot side C and respectively connected to a first set of outlet points $A'_{40,1}$, $B'_{40,2}$, $A'_{40,3}$ and to a second set of outlet points $B'_{40,1}$, $A'_{40,2}$, $B'_{40,3}$.

FIG. 9 is a perspective view of magnetocaloric thermal appliance 10 described in relation with FIG. 1. It comprises a magnetic arrangement with three magnetic rotors $R_1$, $R_2$, $R_3$ which, due to their rotation about the longitudinal axis of thermal appliance 10, subject magnetocaloric elements 3 to a magnetic field variation. The magnetic rotors $R_1$, $R_2$, $R_3$ comprise each a frame on which permanent magnets are mounted. The magnetocaloric elements 3 are mounted in two fixed supports $S_{UP1}$, $S_{UP2}$. The primary fluid is displaced by actuators formed by pistons P actuated by a control cam $C_{10}$ whose cam profile is realized on rotor $R_2$.

The appliance represented in FIG. 9 is symmetrical with respect to rotor $R_2$ and comprises on its cold side F a heat exchanger that materializes exchange zone $E_{10}$ in which the secondary fluid of secondary circuit $S_{10}$ performs the heat exchange with the primary fluid. The hot side C of thermal appliance 10 is located on the right on FIG. 9 and also comprises an exchange zone $E_{11}$.

POSSIBILITIES FOR INDUSTRIAL APPLICATION

This description shows clearly that the invention allows reaching the goals defined, that is to say offer a thermal device 10, 20, 30, 40 liable to improve the heat exchange in a heat exchanger connected to an appliance whose primary fluid is displaced according to an alternating bidirectional movement.

The thermal apparatus 10, 20, 30, 40 according to the invention can find an application, as well industrial as domestic, in the area of heating, air conditioning, tempering, cooling or others, at competitive costs and with reduced space requirements.

The present invention is not restricted to the examples of embodiment described, but extends to any modification and variant which is obvious to a person skilled in the art while remaining within the scope of the protection defined in the attached claims.

The invention claimed is:

1. A thermal appliance (10, 20, 30, 40) comprising an uneven number of N closed primary circuits ($P_{10,i}$, $P_{20,i}$, $P_{30,i}$, $P_{40,i}$, N≥3, i∈[1,N]), each primary circuit comprising at least two outlet points ($A_{10,i}$, $A_{20,i}$, $A_{30,i}$, $A_{40,i}$, $B_{10,i}$, $B_{20,i}$, $B_{30,i}$, $B_{40,i}$) connected in series to at least one heat exchange zone ($E_{10}$, $E_{20}$, $E_{30,1}$, $E_{30,2}$, $E_{40,1}$, $E_{40,2}$, $E'_{40,1}$, $E'_{40,2}$) through which a secondary fluid circulates,
- an operating device that displaces a heat transfer primary fluid in the primary circuits ($P_{10,i}$, $P_{20,i}$, $P_{30,i}$, $P_{40,i}$) in an alternating cycle of period (T) comprising two displacement phases of a half-period (T/2),
- the displacement phases corresponding to two primary fluid displacements generating identical flow rate and volume profiles but in opposite directions,
- the operating device being arranged so that a start of the cycle of the primary fluid is phase-shifted by T/2N between each of the primary circuits ($P_{10,i}$, $P_{20,i}$, $P_{30,i}$, $P_{40,i}$),
- an inlet of the at least one heat exchange zone being connected unidirectionally to a first set comprising a first group of outlet points of the primary circuits whose exiting primary fluid flow rate components are phase-shifted by T/N with respect to each other, and
- an outlet of the at least one heat exchange zone being connected unidirectionally to a second set comprising a second group of outlet points of the primary circuits whose exiting primary fluid flow rate components are also phase-shifted by T/N with respect to each other and phase-shifted by T/2 with respect to the primary fluid flow rate components, exiting the outlet points of the first set, so that a sum of the heat transfer fluid flow rates of the first set entering the exchange zone is always greater than zero.

2. The thermal appliance according to claim 1, further comprising a second heat exchange zone having an outlet that is connected unidirectionally to the outlet-points of the first set and having an inlet that is connected unidirectionally to the outlet points of the second set.

3. The thermal appliance according to claim 1, wherein the primary circuits join in a common conduit in the at least one heat exchange zone.

4. The thermal appliance according to claim 1, wherein the primary circuits are connected to separate conduits in the at least one heat exchange zone.

5. The thermal appliance according to claim 1, wherein the exchange zone is arranged so that the primary fluid and the secondary fluid flow countercurrent with respect to one another.

6. The thermal appliance according to claim 1, wherein the primary fluid is displaced in the primary circuits ($P_{10,i}$, $P_{20,i}$, $P_{30,i}$, $P_{40,i}$) successively according to:
   i) a linearly increasing positive flow rate for a duration corresponding to T/2N,
   ii) then a constant positive flow rate for a duration corresponding to (N−2)T/2N,
   iii) then a linearly decreasing positive flow rate for a duration corresponding to T/2N,
   iv) then a linearly decreasing negative flow rate for a duration corresponding to T/2N,
   v) then a constant negative flow rate for a duration corresponding to (N−2)T/2N, and
   vi) then a linearly increasing negative flow rate for a duration corresponding to T/2N.

7. The thermal appliance according to claim 1, wherein the primary circuits ($P_{10,i}$, $P_{20,i}$, $P_{30,i}$, $P_{40,i}$) each comprise four outlet points ($A_{10,i}$, $A_{20,i}$, $A_{30,i}$, $A_{40,i}$, $B_{10,i}$, $B_{20,i}$, $B_{30,i}$, $B_{40,i}$) connected two by two by at least two exchange zones ($E_{40,1}$, $E_{40,2}$, $E'_{40,1}$, $E'_{40,2}$).

8. The thermal appliance according to claim 1, wherein the operating device of the primary fluid in the primary circuits comprises at least one control cam ($C_{10}$) moving pistons and the control cam comprises a profile arranged so as to determine, in each primary circuit, a displacement of the primary fluid according to a periodic reciprocating movement of period (T).

9. The thermal appliance according to claim 1, wherein each primary circuit comprises at least one magnetocaloric element (3) through which the primary fluid passes, and the appliance comprises a magnetic arrangement ($R_1$, $R_2$, $R_3$) arranged to subject alternately the magnetocaloric element (3) to a magnetic field variation and alternately create, in the magnetocaloric element (3), a heating phase and a cooing phase.

10. A method for optimizing the heat exchange of a thermal appliance (10, 20, 30, 40) comprising an uneven number of N closed primary circuits ($P_{10,i}$, $P_{20,i}$, $P_{30,i}$, $P_{40,i}$, N≥3, i∈[1,N]) each primary circuit comprising at least two outlet points ($A_{10,i}$, $A_{20,i}$, $A_{30,i}$, $A_{40,i}$, $B_{10,i}$, $B_{20,i}$, $B_{30,i}$, $B_{40,i}$) connected in series to at least one heat exchange zone ($E_{10}$, $E_{20}$, $E_{30,1}$, $E_{30,2}$, $E_{40,1}$, $E_{40,2}$, $E'_{40,1}$, $E'_{40,2}$) through which a secondary fluid circulates, the method comprising:
   displacing a heat transfer primary fluid in the primary circuits ($P_{10,i}$, $P_{20,i}$, $P_{30,i}$, $P_{40,i}$) in an alternating cycle of period (T) comprising two displacement phases of a half-period (T/2), the phases corresponding to two primary fluid displacements generating identical flow rate and volume profiles but in opposite directions, and
   phase-shifting by T/2N a start of the primary fluid cycle between each of the primary circuits ($P_{10,i}$, $P_{20,i}$, $P_{30,i}$, $P_{40,i}$), in connecting unidirectionally the inlet of said at least one heat exchange zone to a first set comprising a first group of outlet points of the primary circuits whose exiting primary fluid flow rate components are phase-shifted by T/N with respect to one another and in connecting unidirectionally the outlet of the at least one heat exchange zone to a second set comprising a second group of outlet points of the primary circuits whose exiting primary fluid flow rate components are also phase-shifted by T/N with respect to one another and phase-shifted by T/2 with respect to the primary fluid flow rate components exiting the outlet points of the first set so that a sum of the heat transfer fluid flow rates of the first set entering the exchange zone is always greater than zero.

11. The method according to claim 10, further comprising connecting an outlet of a second heat exchange zone, unidirectionally to the outlet points of the first set and connecting an inlet of the exchange zone, unidirectionally to the outlet points of the second set.

* * * * *